US008108891B1

(12) United States Patent
Stecyk et al.

(10) Patent No.: US 8,108,891 B1
(45) Date of Patent: Jan. 31, 2012

(54) V-CHIP HOURS

(75) Inventors: Polly Stecyk, Fountain Valley, CA (US); Edwin Jou, Irvine, CA (US); Shawn Graham, Irvine, CA (US)

(73) Assignee: Mitsubishi Electric Visual Solutions America, Inc., Irvine, CA (US)

( * ) Notice: Subject to any disclaimer, the term of this patent is extended or adjusted under 35 U.S.C. 154(b) by 1092 days.

(21) Appl. No.: 09/295,935

(22) Filed: Apr. 21, 1999

(51) Int. Cl.
*H04N 7/16* (2011.01)
*H04N 7/173* (2011.01)

(52) U.S. Cl. ............... 725/29; 725/25; 725/28; 709/219; 348/460

(58) Field of Classification Search ............... 725/25–31, 725/45, 46; 709/217–232; 348/460
See application file for complete search history.

(56) References Cited

U.S. PATENT DOCUMENTS

| | | | | |
|---|---|---|---|---|
| 4,550,341 A | * | 10/1985 | Naito | 725/25 |
| 4,718,107 A | * | 1/1988 | Hayes | 725/27 |
| 5,465,113 A | * | 11/1995 | Gilboy | 725/29 |
| 5,485,518 A | * | 1/1996 | Hunter et al. | 380/20 |
| 5,548,345 A | * | 8/1996 | Brian et al. | 725/27 |
| 5,550,575 A | * | 8/1996 | West et al. | 348/5.5 |
| 5,583,576 A | * | 12/1996 | Perlman et al. | 348/460 |
| 5,724,472 A | * | 3/1998 | Abecassis | 386/52 |
| 5,751,335 A | * | 5/1998 | Shintani | 725/25 |
| 5,828,402 A | * | 10/1998 | Collings | 348/5.5 |
| 5,859,662 A | * | 1/1999 | Cragun et al. | 725/137 |
| 5,959,471 A | * | 9/1999 | Weinfurtner | 327/94 |
| 5,969,748 A | * | 10/1999 | Casement et al. | 725/27 |
| 5,973,683 A | * | 10/1999 | Cragun et al. | 345/719 |
| 5,995,133 A | * | 11/1999 | Kim | 725/28 |

(Continued)

FOREIGN PATENT DOCUMENTS

WO   WO 99/44361   9/1999

OTHER PUBLICATIONS

Decarmo (2002/0016962), Method and system for selecting content in a media stream, Dec. 23, 1998.*

*Primary Examiner* — Annan Shang
(74) *Attorney, Agent, or Firm* — Orrick, Herrington & Sutcliffe LLP

(57) ABSTRACT

Systems, methods and apparatuses are provided for allowing a user to supervise personal exposure to a program exhibited by a consumer electronics device, such as, e.g., a television system. The consumer electronics device includes "V-chip" circuitry that analyzes a program signal and either blocks or passes the program signal based on certain content and time based criteria. In this connection, a user can program the "V-chip" circuitry with the content- and time-based criteria in the form of one or more content-based specifications, which specify a rating and/or a subject matter category, and finite time range specifications, which are associated with the content-based specifications. The "V-chip" circuitry receives one or more content-based indicators, which are indicative of a rating and/or a subject matter category of the program, and a reference time from an external source, such as the program signal. The "V-chip" circuitry compares the content-based indicators with the content-based specifications when the reference time falls within one of the finite time ranges. Based on this comparison, the "V-chip" circuitry either passes the program signal to an output device for transformation of the program signal into the program or blocks the program signal from being sent to the output device.

46 Claims, 8 Drawing Sheets

U.S. PATENT DOCUMENTS

| | | | |
|---|---|---|---|
| 6,025,869 A * | 2/2000 | Stas et al. | 725/28 |
| 6,072,520 A * | 6/2000 | Yuen et al. | 725/27 |
| 6,104,423 A * | 8/2000 | Elam | 725/28 |
| 6,115,057 A * | 9/2000 | Kwoh et al. | 348/5.5 |
| 6,125,259 A * | 9/2000 | Perlman | 455/6.2 |
| 6,144,401 A * | 11/2000 | Casement et al. | 725/30 |
| 6,212,679 B1 * | 4/2001 | Vornsand | 725/25 |
| 6,216,263 B1 * | 4/2001 | Elam | 725/28 |
| 6,226,793 B1 * | 5/2001 | Kwoh | 725/28 |
| 6,286,141 B1 * | 9/2001 | Browne et al. | 725/39 |
| 6,317,795 B1 * | 11/2001 | Malkin et al. | 709/246 |
| 6,321,381 B1 * | 11/2001 | Yuen et al. | 725/28 |
| 6,505,348 B1 * | 1/2003 | Knowles et al. | 725/49 |
| 6,529,526 B1 * | 3/2003 | Schneidewend | 370/486 |
| 6,675,384 B1 * | 1/2004 | Block et al. | 725/28 |
| 6,701,523 B1 * | 3/2004 | Hancock et al. | 725/25 |
| 6,732,367 B1 * | 5/2004 | Ellis et al. | 725/27 |
| 6,760,915 B2 * | 7/2004 | deCarmo | 725/28 |
| 2002/0095673 A1 * | 7/2002 | Leung et al. | 725/25 |
| 2002/0109732 A1 * | 8/2002 | Ward et al. | 345/810 |
| 2004/0128681 A1 * | 7/2004 | Hancock et al. | 725/30 |
| 2004/0179820 A1 * | 9/2004 | Kashiwagi et al. | 386/95 |

* cited by examiner

V-CHIP HOURS

FIELD OF THE INVENTION

This invention relates to the field of consumer electronics devices, and more particularly to methods and systems for limiting personal exposure to a television system or other consumer electronics device.

BACKGROUND

There has been long-standing concern on the part of parents or guardians as to the content of programs watched by children and minors. This concern has been long-standing with respect to televisions, and more recently, with respect to on-line services such as, those provided through service providers, such as America Online, or through other electronic means of text and image-based communication.

Various attempts have been made to limit access by children to subject matter that is deemed inappropriate. Certain locks simply block specific channels, where those channels are either known to or are suspected to carry programming which is deemed unacceptable for viewing by children. Other systems incorporate time-based limitations, for example, where the entire television may not be used during certain hours. Typically the set time limits would preclude operation of the system during "bedtime" hours or at times when parental supervision does not exist, e.g., after school hours. Yet other lock systems serve to make the entirety of the system unavailable other than to authorized users.

Various attempts have been made to provide more refined lock systems. One attempt, the so-called "V-chip" system, utilizes a coding system indicative of content. For example, a given show may be designated as including adult language, violence or nudity. These indicators are often provided by single letter designators, such as L, V and N, respectively. Other coding systems analogous to movie rating codes, such as G for general audience, PG for parental guidance, R for restricted, etc., may also serve as a censor-based assessment of the content. These content-based designators are carried in television systems over the extended data service (XDS or EDS) system. The adopted standard for NTSC television is the EIA-608 standard. Information which is typically carried in such systems includes the network name, show title, and brief description FIG. 2 shows a schematic drawing of the prior art "V-chip" system. A television or other display 30 is the ultimate recipient of display of the contents of the show. There are currently proposals to include rating information of the type previously mentioned in the XDS data.

FIG. 1 shows a typical format of EIA-608 standards as a function of time. Initially, a horizontal sync pulse 10 initiates a pulse train. A color burst pulse 12 follows the horizontal sync pulse, and is typically provided for all line scans. Next, a clock run-in-signal 14 serves as a synchronizing signal. A sequence of start bits 16, labeled S1, S2 and S3 follow. As depicted, the pulse train here is shown with pulse S3 being "high" and S1 and S2 being "low." In the extended data service system, various characters are then provided. Character one 18 is composed of bits (labeled B0, B1, B2, B3, B4, B5 and B6) and a parity check bit 22 (labeled P1). Character two 24 is composed of bits (labeled B0, B1, B2, B3, B4, B5, B6 and B7) and a parity check bit 26 (labeled P2) for the byte of character two 24. Typically, the XDS data is carried on a line, which is not visible on the television display, such as line 21.

FIG. 2 shows a schematic drawing of the prior art "V-chip" system. A television or other display 30 is the ultimate recipient of display information. Initially, some source of information such as a television signal 32 is supplied from any number of sources, such as over-the-air transmission, cable or other recorded source. Channel selection 34 controls the tuner 36 to select the desired information from television signal 32. The output of tuner 36 is an audio/video signal 38 corresponding to the channel selected. A data slicer 40 is coupled to the output of the tuner 36. The data slicer 40 functions to monitor the XDS signal as carried in the audio/video signal 38. The data slicer 40 may either strip the XDS signal from the audio/video signal 38 or simply duplicate the XDS signal. With the "V-chip" system, the XDS data obtained by the data slicer 40 is program rating information. The program rating information is supplied from the data slicer 40 to the comparator 42. A list 44 of prohibited ratings is stored or provided. Typically, the system would identify all prohibited ratings by level, such as R and X, though a system could utilize logic to prohibit any rating at a given level or above (the convention above meaning more mature or more likely to be prohibited). In the event of coincidence between the output of the data slicer 40 comprising the rating data of the program and the list of prohibited ratings 44, the comparator 42 provides a blocking signal 46 to signal blocking mechanism 48. The signal blocking mechanism 48 functions as a switch, blocking or otherwise scrambling audio/video signal 38, such that the show having the prohibited rating is not displayed.

The process of determining whether to block or scramble the audio/video signal 38 requires a certain amount of time to perform, which manifests itself as a delay, typically, when a viewer changes television channels. This delay in time can be avoided by disabling the V-chip system, such that the audio/video signal 38 is automatically sent to the television display 30 without performing the aforementioned analysis. However, this requires the parent to continuously disable the V-chip system during adult viewing and enable the V-chip system during child viewing. This can become quite tedious, and more importantly, leaves open the possibility that the parent may forget to enable the V-chip system when adult viewing has ended.

SUMMARY OF THE INVENTION

This present invention comprises novel methods, apparatuses and systems for supervising personal exposure to a consumer electronics device, such as, e.g., a television system, by reviewing programs for a selected content threshold during a finite time period and not reviewing programs for the selected content threshold during another finite time period.

In a preferred method of the present invention, a program signal is received by a consumer electronics device with "V-chip" circuitry, which without intervention would be transformed into user discernible information for exhibition to a user. In the case of a television system, the user discernible information may represent itself as a picture and sound. One or more content-based indicators, such as, e.g., a television or movie rating or a subject matter category, are received. These content-based indicators are indicative of the content of the user discernible information. Timing information, such as, e.g., the current time, is also received. The content-based indicators and timing information can be carried by the program signal itself, or they can originate from some other source. One or more content-based specifications, such as, e.g., a rating or subject matter category, and one or more finite time range specifications associated with each of the content-based specifications can then be selected. Either the user or the manufacturer can effect selection by programming the content-based specification and associated finite time range specifications into the "V-chip" circuitry.

Each of the received content-based indicators is then compared to each of the selected content-based specifications when the reference time falls with a selected finite time range. In response to the comparison, a control signal is generated, which either causes the program signal to be impaired (block control signal), for instance by means of blocking or scrambling, or unimpaired (pass control signal). In the case of a television system, one or more of the video, audio, or closed captioning aspects of the program signal can be impaired. The block control signal can be generated if a received content-based indicator exceeds (if rating) or matches (if categorical) a selected content-based indicator. The pass control signal can be generated if none of the received content-based indicators exceeds (if rating) or matches (if categorical) a selected content-based indicator.

In a preferred embodiment of the present invention, a consumer electronics device includes "V-chip" circuitry comprising a logic unit, non-volatile memory and a signal impairing mechanism. The "V-chip" circuitry can be utilized in a television system, a video cassette recorder, audio equipment, or any consumer electronics device whereby user discernible information can be generated. The "V-chip" circuitry allows the consumer electronics device to transform a program signal into user discernible information if the program signal meets certain content- and time-based criteria, and prevents the consumer electronics device from transforming the program signal into user discernible information if the program signal does not meet certain content- and time-based criteria.

In this regard, the logic unit is coupled to the non-volatile memory and is configured for performing the following upon execution of instructions stored within the non-volatile memory. The logic unit receives one or more content-based indicators and a reference time, which, if carried by the program signal, can be extracted or copied by a data extraction device, such as, e.g., a data slicer. The logic unit also receives one or more content-based specifications and associated finite time range specifications, which have been selected by either the user or the manufacturer and stored in the non-volatile memory. The logic unit then compares the received content-based indicators with selected content-based specifications when the reference time falls within one of the selected finite time ranges. The logic unit then generates either a pass control signal or a blocking control signal based on this comparison.

The signal impairing device receives the program signal and is configured for either passing the program signal therethrough without substantial impairment or passing the program signal therethrough with substantial impairment. The signal impairing device is coupled to the logic unit for receiving the control signals therefrom. Upon receipt of the block control signal, the signal impairing device blocks or scrambles the program signal. Upon receipt of the pass control signal, the signal impairing device passes the program signal through without substantial impairment.

Other and further objects, features, aspects, and advantages of the present invention will become better understood with the following detailed description of the accompanying drawings.

BRIEF DESCRIPTION OF THE DRAWINGS

The drawings illustrate both the design and utility of preferred embodiments of the present invention, in which.

DETAILED DESCRIPTION OF THE PREFERRED EMBODIMENTS

Figure 1:
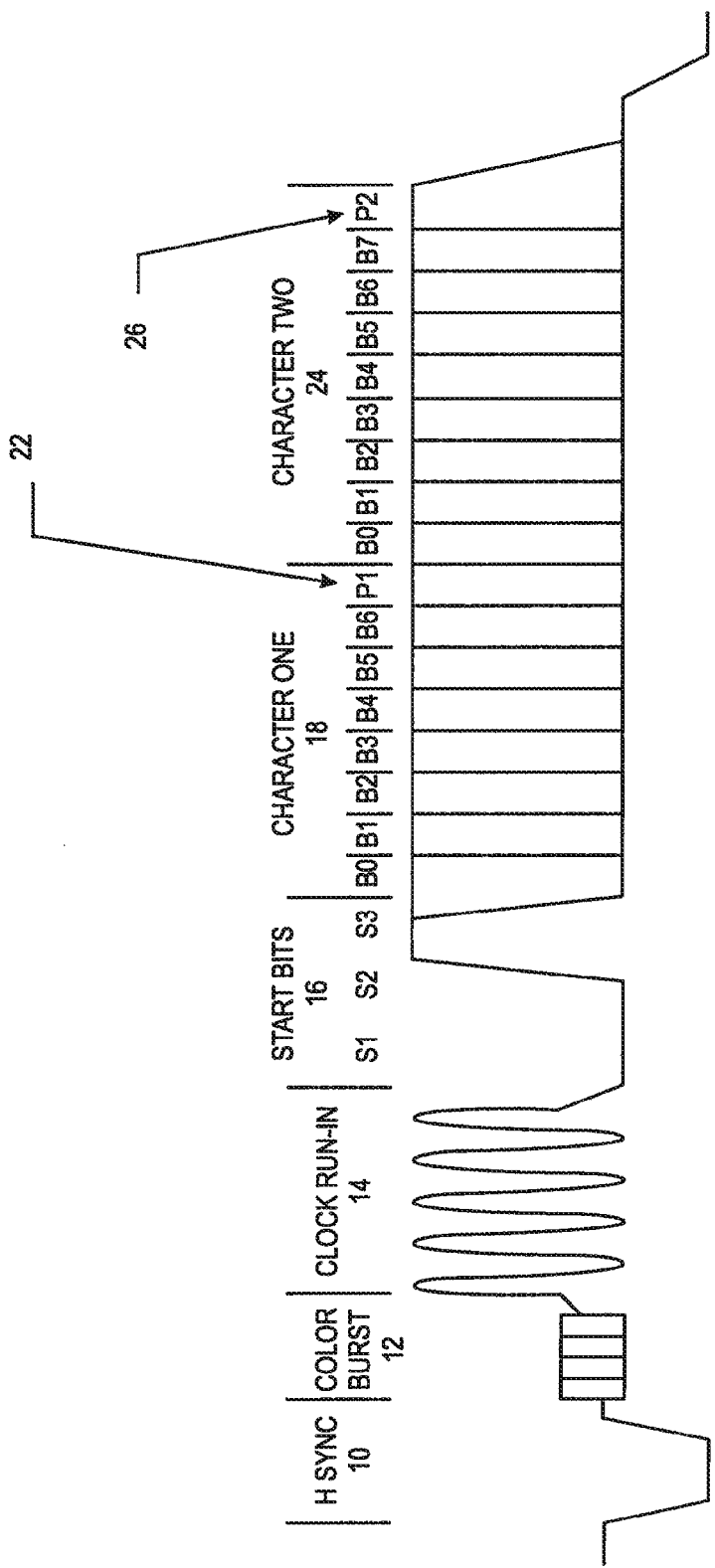
FIG. 1 shows the prior art EIA-608 standards, depicting a typical signal as a function of time.
Figure 2:
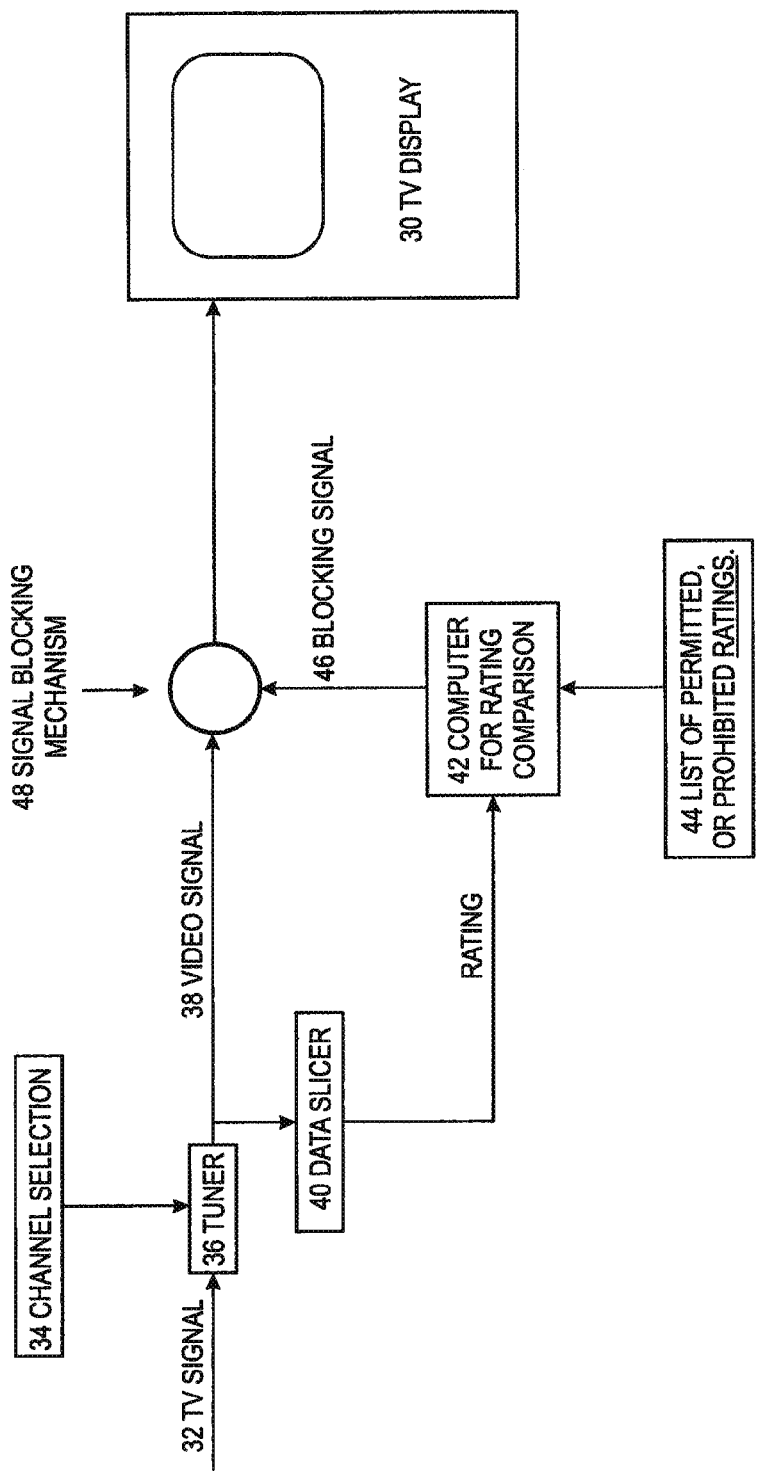
FIG. 2 is a schematic drawing of the prior art "V-chip" system.
Figure 3:
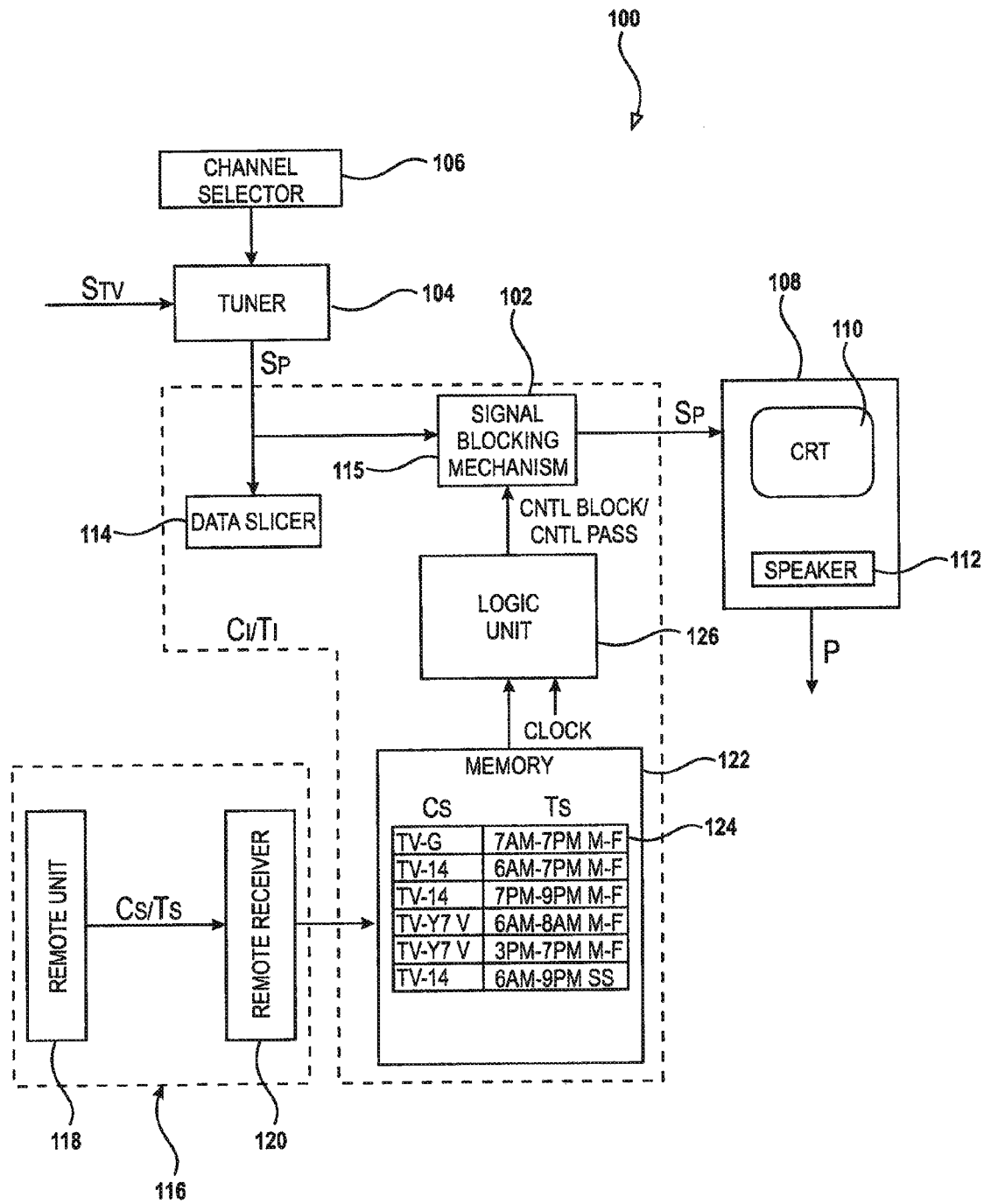
FIG. 3 is a schematic drawing of a preferred embodiment of a "V-chip" system constructed in accordance with the present invention.

FIG. 3 shows a schematic representation of a consumer electronics system 100, and in particular a television system, constructed in accordance with a preferred embodiment of the invention. It should be noted that the consumer electronics system 100 is not to be limited to a television system, but can include any type of system that receives information that a parent might find objectionable, such as, e.g., a video cassette recorder (VCR), audio equipment and computer equipment. In general, the television system 100 receives a television program signal $S_{TV}$, and absent intervention, provides a program P to a viewer in the form of audio/visual information. The television system 100 includes "V-chip" circuitry 102 that can be programmed by a user, such as, e.g., a parent, to selectively limit exposure of any programs to children that the user feels contain inappropriate subject matter. In particular, the "V-chip" circuitry 102 can be programmed to block the program P if the content and time of the program P meet certain criteria selected by the user.

In this connection, the television system 100 includes a tuner 104, which receives the television signal $S_{TV}$, and, under the control of a channel selector 106, provides a program signal $S_P$ at an output. Typically, the television signal $S_{TV}$ includes a broad range of program channels when received via an antenna or directly from cable entering the premises. It is often the case, however, that the television signal $S_{TV}$ received by the tuner 104 has been pre-tuned, for example, through a cable box or video cassette recorder (VCR) (both not shown). In this case, the television signal $S_{TV}$ received by the television system 100 includes a single program channel. The television system 100 further includes an audio/visual output device 108, which transforms the program signal $S_P$ into the program in the form of a display on a cathode ray tube (CRT) 110 and sound from a speaker 112.

The "V-chip" circuitry 102 of the television system 100 includes a signal blocking mechanism 115, which is coupled to the output of the tuner 104 to receive the program signal $S_P$. The signal blocking mechanism 115 is shown as a simple switch, but can be any mechanism that allows a signal to be selectively passed and blocked. Depending on the state of a control signal received by the signal blocking mechanism 115, the program signal $S_P$ is either blocked from passing or allowed to pass to the audio/video output device 108. In alternative embodiments, the "V-chip circuitry 102 includes a signal scrambler, which either scrambles the program signal $S_P$ or passes the program signal $S_P$ to the audio/video output device 108 without impairment thereof.

In this particular embodiment, the program signal $S_P$ not only includes information required to provide the program to the viewer, but also one or more content-based indicators $C_I$ and timing information $T_I$. The content-based indicators $C_I$ are indicative of the content of the program P, and preferably include a rating, such as, e.g., a television or movie rating, or a subject matter category, such as, e.g., sex or violence. Presently, the Federal Communications Commission (FCC) dictates the following ratings and subject matter categories: television ratings shall include TV-Y, TV-Y7, TV-G, TV-PG, TV-14 and TV-MA; movie ratings shall include G, PG, PG-13, R, NC-17 and X; and the subject matter categories include FV (Fantasy Violence), D (Sexual Dialog), L (Adult Language), S (Sexual Situations) and V (Violence). It can be appreciated by those skilled in the art that the -present invention is not limited to the above-disclosed ratings and categories, but can encompass any content-based indicator $C_I$ that provides information allowing an individual to determine the content of a particular program received by the television system 100. The timing information $T_I$ indicates a reference time, such as, e.g., the current time.

The content-based indicators $C_I$ and timing information $T_I$ are incorporated into the program signal $S_P$, preferably using an extended data service (XDS or EDS) system. It can be appreciated by those skilled in the art that the content-based indicators $C_I$ and timing information $T_I$ can originate from any source dependent or independent from the program signal $S_P$. For instance, the content-based indicators $C_I$ and timing information $T_I$ can be supplied by the Program Status Information Protocol (PSIP) or an Electronic Program Guide (EPG). The timing information $T_I$ can also originate from within the television system 100 via a user setting. The "V-chip" circuitry 102 further includes a data extraction device 114, which is coupled to output of the tuner 104 to receive the program signal $S_P$. In this embodiment, the data extraction device 114 is a closed caption data slicer, which monitors the program signal $S_P$ and obtains from it XDS information, namely, the content-based indicators $C_I$ and the timing information $T_I$.

A user entry system 116, typically embodied in a remote control unit 118 and a corresponding remote receiver 120, is the mechanism by which a user inputs one or more content-based specifications $C_S$ and one or more finite time range specifications $T_S$ associated with the content-based specifications $C_S$. The content-based specifications $C_S$ are indicative of the content of any program P that the user wishes to limit, and like the content-based indicators $C_I$, the content-based specification $C_S$ can be selected from a variety of content ratings and subject matter categories. The associated finite time range specifications $T_S$ are the time ranges during which the user wishes to limit the content of any program P. The "V-chip" circuitry 102 includes non-volatile memory 122, which is coupled to the program entry system 116 for receiving and storing the content-based specifications $C_S$ and associated finite time range specifications $T_S$ in a look-up list 124. Preferably, the non-volatile memory 122 is embodied in Flash Memory or an EEPROM.

The "V-chip" circuitry 102 further includes a logic unit 126 to generate either a block control signal $CTRL_{BLOCK}$, which causes the signal blocking mechanism 115 to preclude the program signal $S_P$ from being passed effectively to the audio/video output device 108, or a pass control signal $CTRL_{PASS}$, which permits the program signal $S_P$ to be passed via the signal blocking mechanism 115 to the audio/video output device 108. In the preferred embodiment, the logic unit 126 is preferably implemented as a microprocessor. While an integrated device is preferable, any analog or digital system, discrete or integrated, or combinations thereof may be utilized if the functionalities of the invention may be achieved. For expository convenience, the logic unit 126 will be identified as a comparator, though the label comparator is not intended to exclude other logic combinations or functionalities.

The logic unit 126 is coupled to the output of the data slicer 114 to receive the extracted content-based indicators $C_I$ and the current time $T_I$, and the non-volatile memory 122 to receive the content-based specifications $C_S$ and associated finite time range specifications $T_S$. The logic unit 126 compares the content-based indicators $C_I$ with the content-based specifications $C_S$ when the current time $T_I$ falls within the associated finite time range specifications $T_S$, and generates a control signal CTRL in response thereto, which either constitutes a block control signal $CTRL_{BLOCK}$ or a pass control signal $CTRL_{PASS}$. The logic unit 126 is coupled to a clocking signal CLOCK, which allows the control signal CTRL to be periodically updated, preferably, during every frame of the program signal $S_P$ (about every 16 ms). The control signal CTRL can, however, be updated less frequently, e.g., every second or every minute.

Figure 4:
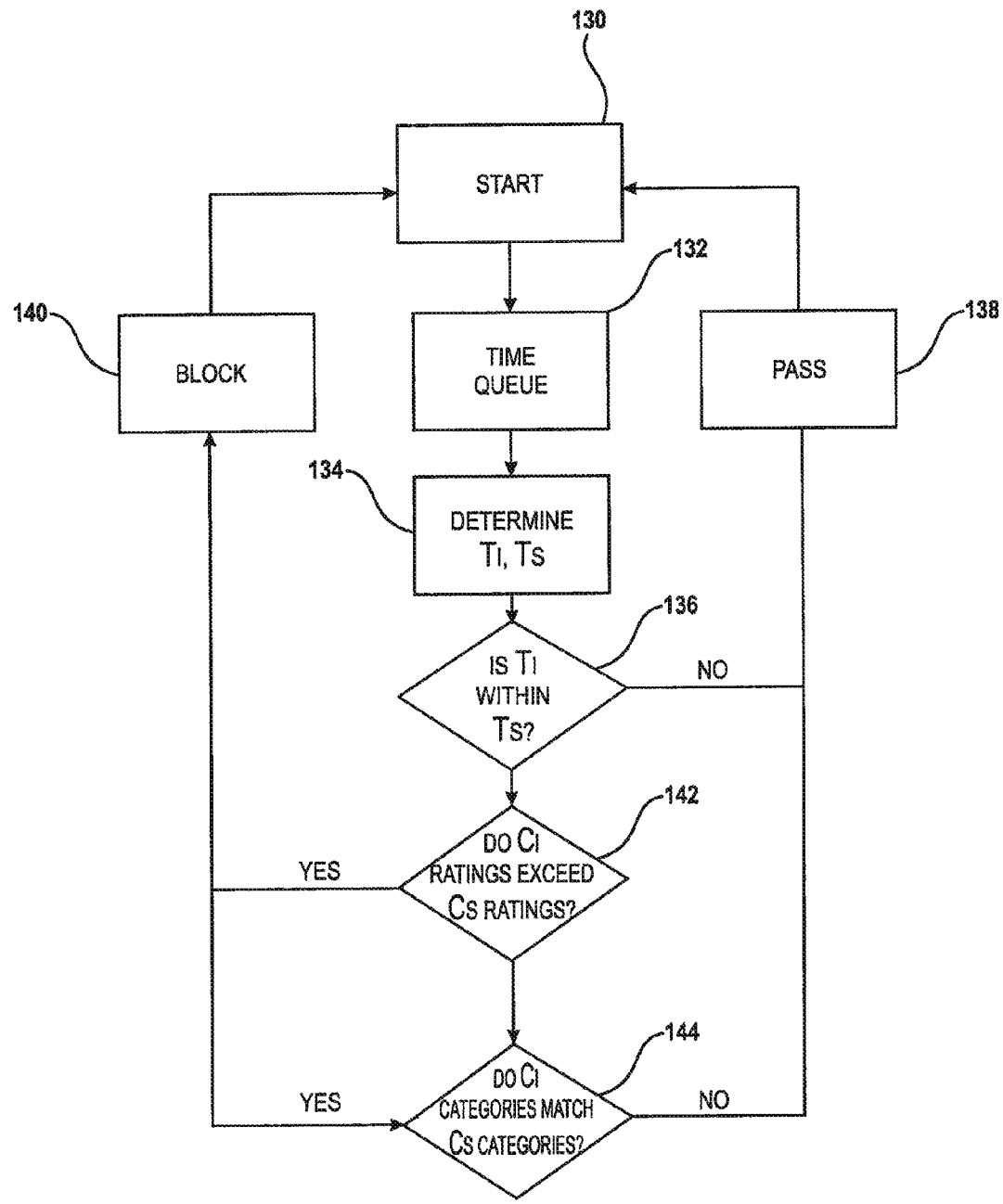
FIG. 4 is a flowchart showing a preferred method of selecting between blocking or passing a program signal performed in the "V-chip" system of FIG. 3.

Referring to FIG. 4, operation of the logic unit 126 is explained in further detail. At step 130, the control signal CTRL generated by the logic unit 126 either indicates BLOCK or PASS. When the control signal CTRL indicates BLOCK, the signal blocking mechanism 115 blocks the program signal $S_P$ from being sent to the audio/video output device 108. For the purposes of this specification, it should be understood that blocking the program signal $S_P$ entails blocking at least one of the video, audio and captioning aspects of the program signal $S_P$. Preferably, however, all three of these aspects are blocked, such that the picture, sound and captioning will not be output from the audio/video output device 108. When the control signal CTRL indicates a PASS, the signal blocking mechanism 115 sends the program signal $S_P$ to the audio/video output device 108, such that the picture, sound and captioning are output.

At step 132, the logic unit 126 waits for a time queue from the clock signal CLOCK, and upon receipt of the time queue, the logic unit 126 determines, at steps 134 and 136, whether the "V-chip" circuitry 102 has been enabled by determining whether the current time $T_I$ falls within any of the time range specifications $T_S$. In particular, the logic unit 126 determines, at step 134, the current time $T_I$ obtained from the program signal $S_P$ and any time ranges specifications $T_S$ obtained from the look-up list 124. The logic unit 126 then determines, at step 136, whether the determined current time $T_I$ falls within any of the determined time range specifications $T_S$. If the current time $T_I$ does not fall within any of the determined time range specifications $T_S$, the logic unit 126, at step 138, generates a pass control signal $CTRL_{PASS}$, thereby passing the program signal $S_P$ to the audio/video output device 108. Thus, the "V-chip" circuitry 102 is disabled. If the current time $T_I$ does fall within any of the determined time range specifications $T_S$, the logic unit 126 analyzes the content-based indicators $C_I$ vis-à-vis the content-based specifications $C_S$. Thus, the "V-chip" circuitry 102 is enabled. Of course, the television system 100 may be configured, such that the "V-chip" circuitry 102 may be enabled or disabled independently from the time range specifications $T_S$. For instance, the "V-chip" circuitry 102 may be optionally operated in a standard analysis mode, whereby the "V-chip" circuitry 102 can be enabled to automatically analyze the content-based indicators $C_I$ vis-à-vis the content-based specifications $C_S$ without regard to time, or disabled to automatically pass the program signal $S_P$ to the audio/video output device 108. For ease of illustration, details concerning this feature will not be set forth.

If the "V-chip" circuitry 102 is found to be enabled, the logic unit 126 determines, at step 142, the content-based indicators $C_I$ obtained from the program signal $S_P$ and the content-based specifications $C_S$ corresponding to those time range specifications $T_S$ in which the current time $T_I$ falls. At steps 140 and 142, the content-based indicators $C_I$ are compared with the content-based specifications $C_S$. In the case of program ratings, if any of the content-based indicator $C_I$ ratings exceed any of the content-based specification $C_S$ ratings (typically, there will be a maximum of two content-based specification $C_S$ ratings—a television rating and a movie rating), the logic unit 126, at step 140, generates a block control signal $CTRL_{BLOCK}$, thereby blocking the program signal $S_P$ from being sent to the audio/video output device 108. If any of the content-based indicator $C_I$ ratings do not exceed any of the content-based specification $C_S$ ratings, the logic unit 126 goes to step 144.

If any of the content-based indicator $C_I$ categories matches any of the content-based specification $C_S$ categories, the logic unit 126, at step 140, generates a block control signal $CTRL_{BLOCK}$, thereby blocking the program signal $S_P$ from being sent to the audio/video output device 108. If none of the content-based indicator $C_I$ categories matches any of the content-based specification $C_S$ categories, the logic unit 126, at step 138, generates a pass control signal $CTRL_{PASS}$, thereby passing the program signal $S_P$ to the audio/video output device 108. The logic unit 126 then proceeds to step 130, where the analysis process is repeated. The logic unit 126 performs the aforementioned steps by executing instructions that preferably take the form of computer software stored in the memory 122 or other suitable storage medium, such as, e.g., a ROM chip, or fixed logic, such as, e.g., an ASIC.

Figure 5:
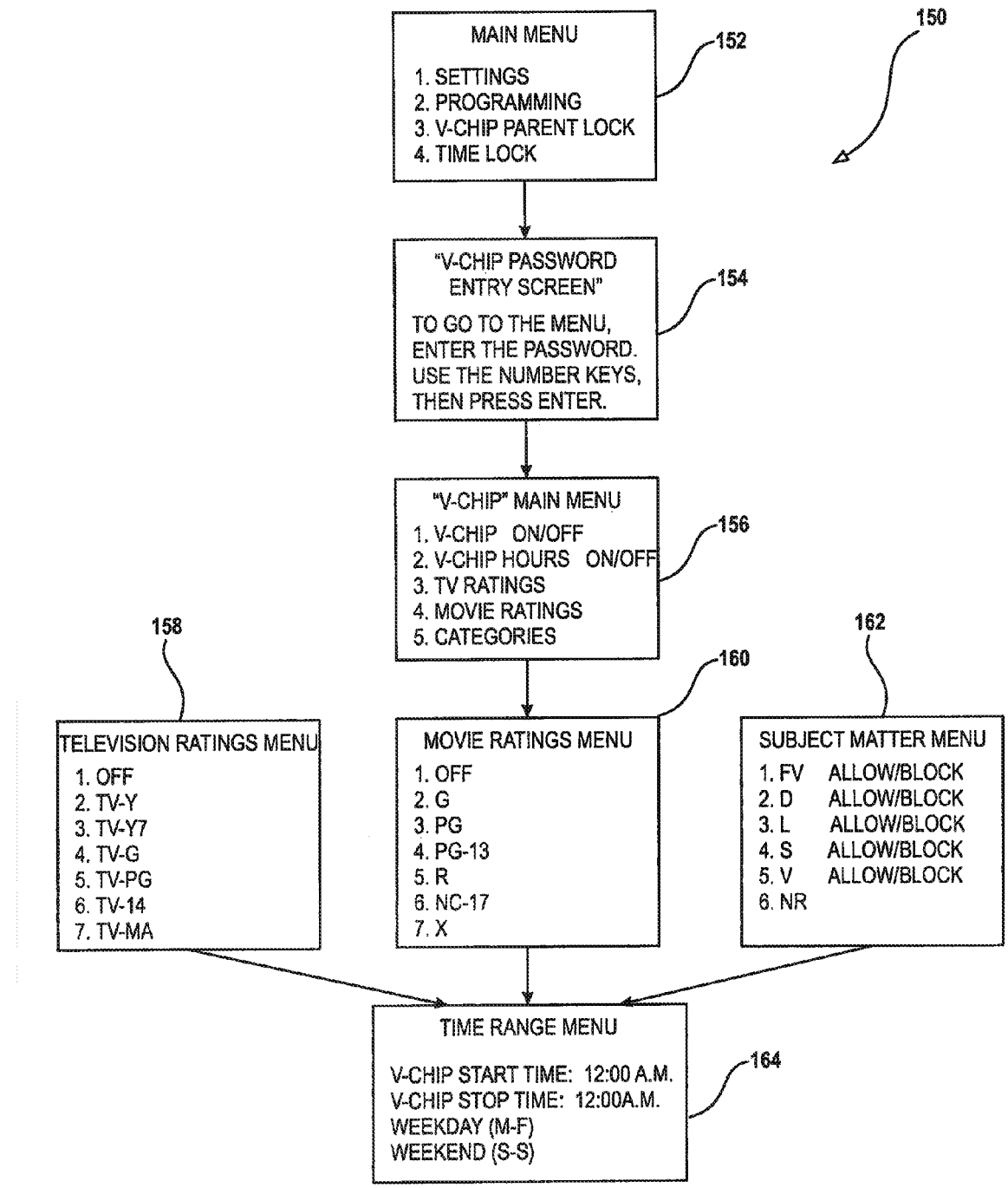
FIG. 5 is a menu system that allows a user to program the "V-chip" system of FIG. 3 with content-based specifications and associated finite time range specifications.

Programming of the content-based specifications $C_S$ and associated finite time range specifications $T_S$ into the "V-chip" circuitry 102, and in particular the look-up list 124 of the non-volatile memory 122, is preferably effected through the use of a menu system 150, shown in FIG. 5. As depicted, the menu system 150 includes an array of menus, which includes a main menu 152, a "V-chip" password entry screen 154, a "V-chip" main menu 156, a television ratings menu 158, a movie ratings menu 160, a subject matter categories menu 162 and a time range menu 164.

Figure 6:
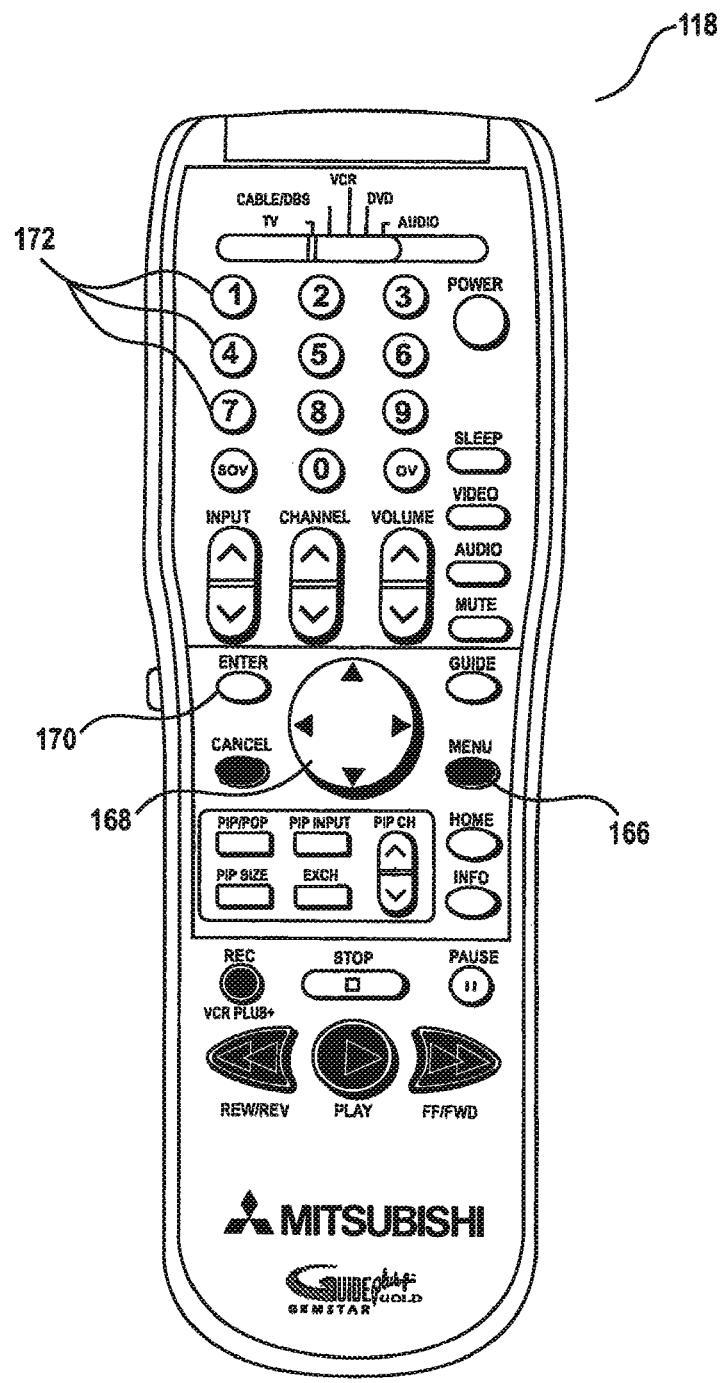
FIG. 6 is a detailed depiction of a remote control unit used in conjunction with the menu system of FIG. 5.

The user entry system 116, and in particular the remote control unit 118 (shown in detail in FIG. 6), is the operative device through which the user can interact with the menu system 150. The remote control unit 118 includes a menu key 166, adjust thumb disc 168, enter key 170 and numeric keys 172 to allow the user to input selected information via the menu system 150. Depression of the menu key 166 displays the main menu 152 when the television system 100 is in a home state (i.e., normal operation of the television system 100). If the main menu 152 is displayed, subsequent depression of the menu key 166 returns the user back to the home state. If one of the submenus is displayed, depression of the menu key 166 displays the previous menu. The adjust thumb disc 168 allows the user to scroll up, down, left or right within the menu system 150 to select a particular menu item. Depression of the enter key 170 allows the user to enter a selected menu item into the non-volatile memory 122.

Within the main menu 152, the user can select the "V-chip Parent Lock" menu item, which takes the user to the "V-chip" password entry screen 154. A password, preferably known only by the parents, is entered via the numeric keys 172. If the correct password is entered, the user is taken to the "V-chip" main menu 156. If an incorrect password is entered, the user is not taken to the "V-chip" main menu 156, and the words "try again" are displayed. In the "V-chip" main menu 156, the user can select V-CHIP ON or V-CHIP OFF to alternately enable and disable the "V-chip" circuitry 102. If the user selects V-CHIP ON, the user can then select V-CHIP HOURS ON or V-CHIP HOURS OFF to alternately enable the "V-chip" circuitry 102 to analyze the program signal with regard to time, and disable the "V-chip" circuitry 102 to analyze the program signal without regard to time. The "V-chip" main menu 156 can also be used to select the type of content-based specification $C_S$ to be entered into the look-up list 124. That is, the user can select TV RATINGS, MOVIE RATINGS, or CATEGORIES, to take the user respectively to the television ratings menu 158, movie ratings menu 160, or subject matter categories menu 162. Preferably, the menu system 160 requires the user to first select a content-based specification $C_S$, and then a time range specification $T_S$ associated with the selected content-based specification $C_S$. However, it should be appreciated that the menu system 150 can be configured to require selection of the time range specification $T_S$ followed by selection of the content-based specification $C_S$ without straying from the principles taught by this invention.

Within the television ratings menu 158, the user can select a particular television rating, which prevents any program P exceeding the selected television rating from being output from the audio/video output device 108. The television ratings can be selected from the following: OFF, TV-Y, TV-Y7, TV-G, TV-PG, TV-14 and TV-MA. A selection of OFF removes the previously selected content-based specification $C_S$ television rating and corresponding time range(s) from the look-up list 124. A selection of any of the television ratings stores the selected television rating, as a content-based specification $C_S$, in the look-up list 124. Since a selection of a particular rating is effectively also a selection of all ratings below the selected rating, a selection of TV-MA is effectively the same as selecting OFF. As will be described in further detail below, however, selection of TV-MA affects the selection of the subject matter categories.

Within the movie ratings menu 160, the user can select a particular movie television rating, which prevents any program P exceeding the selected movie rating from being output from the audio/video output device 108. The movie ratings can be selected from the following: OFF, G, PG, PG-13, R, NC-17 and X. A selection of OFF removes the previously selected content-based specification $C_S$ movie rating and corresponding time range(s) from the look-up list 124. A selection of any of the movie ratings stores the selected movie rating, as a content-based specification $C_S$, in the look-up list 124. Selection of X is effectively the same as selecting OFF.

Within the subject matter categories menu 162, the user can select either to allow or block any program P from being sent to the audio/video output device 108 when the program P contains subject matter falling within the selected subject matter category. The subject matter categories can be selected from the following: FV (Fantasy Violence), D (Sexual Dialog), L (Adult Language), S (Sexual Situations), V (Violence) and Non-Rated Programs. A selection to allow a particular category, removes the content-based specification $C_S$ corresponding to that category from the look-up list 124. Conversely, a selection to block a particular category stores the selected category, as a content-based specification $C_S$, in the look-up list 124.

As currently dictated by the FCC, certain subject matter categories can be selected only if certain television ratings have been selected. For instance, category FV can only be selected if TV-Y7 has been selected. Category D can only be selected if TV-PG or TV-14 has been selected. Categories L, S and V can only be selected if TV-PG, TV-14 or TV-MA has been selected. Thus, the selection of categories enhances the television rating selected by the user. For instance, if television rating TV-14 and category S is selectively allowed, then all programs rated TV-MA are blocked and all programs containing sexual situations are blocked. Thus, the discretionary aspect of a selected television rating can be supplemented by further selecting a subject matter category. In this case, the following combinatory content-based specifications $C_S$ can be created: TV-Y7 FV, TV-PG D, TV-PG L, TV-PG S, TV-PG V, TV-14 D, TV-14 L, TV-14 S, TV-14 V, TV-MA L, TV-MA S and TV-MA V. Some programs, such as, e.g., news and sports, are not rated or are un-rated. In this case, the user can select to allow all non-rated programs or block all non-rated programs. If the TV rating is OFF, non-rated programs cannot be selected.

After a particular content-based specification $C_S$ is selected, the user is brought to the time range menu 164 wherein the user can define one or more time range specifications $T_S$ to be associated with the selected content-based specification $C_S$. The time range specification $T_S$ can be defined by entering a time into the V-CHIP START TIME entry and entering a time into the V-CHIP STOP TIME entry. The defined time range specification $T_S$ is then entered in the look-up list 124. Another time range specification $T_S$ associated with the selected content-based specification $C_S$ can be defined by again entering times into the V-CHIP START TIME and V-CHIP STOP TIME entries. Preferably, the time range specification $T_S$ defined can be applied to each work day of the week (M-F) or to the weekends. This can be accomplished by selecting either the WEEKDAY (M-F) or the WEEKEND (S-S) after selection of the time range.

Figure 7:
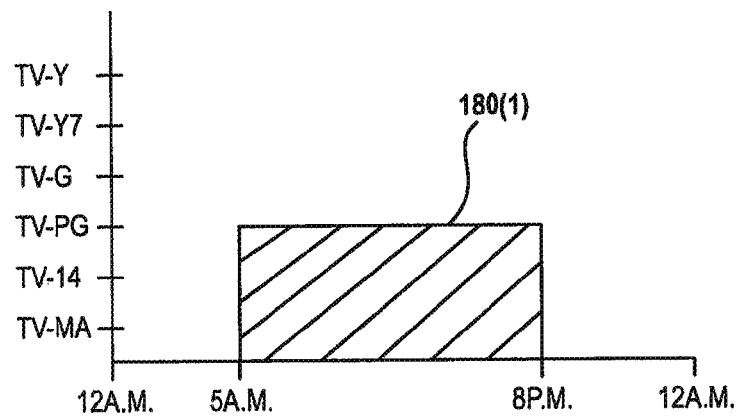
FIG. 7 is a simple rating/time contour, which can be generated by programming the "V-chip" system of FIG. 3.

By selecting content-based specifications $C_S$ and corresponding time range specifications $T_S$, a parent is able to tailor the enablement and disablement of the "V-chip" circuitry 102 around the schedules of a family. For example, FIGS. 7-12 depict a variety of rating/time contours 180 that can be programmed into the "V-chip" circuitry 102. FIG. 7 depicts a simple rating/time contour 180(1) that can be programmed into the "V-chip" circuitry 102 by a parent with pre-school children. In this case, the parent specifies a television rating of TV-G and a corresponding time range between 5:00 AM and 8:00 PM. Thus, between 5:00 AM and 8:00 PM when the pre-school children are awake, the "V-chip" circuitry 102 analyzes the program signal $S_P$ and prevents the pre-school children from watching any programs with a rating exceeding TV-G. Between 8:00 PM and 5:00 AM, when the pre-school children are asleep, the "V-chip" circuitry 102 does not analyze the program signal $S_P$, allowing adults to watch any program without intrusion from the "V-chip" circuitry 102.

Figure 8:
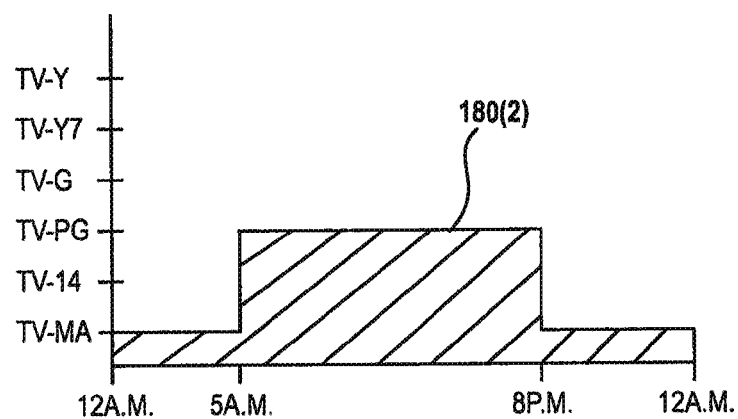
FIG. 8 is a simple rating/time contour with a maximum rating, which can be generated by programming the "V-chip" system of FIG. 3.

FIG. 8 depicts a simple rating/time contour 180(2) with a maximum rating that can be programmed into the "V-chip" circuitry 102 by a parent with pre-school and pre-teen children. In this case, the parent specifies a television rating of TV-G and a corresponding time range between 5:00 AM and 8:00 PM. Thus, as with the rating/time counter 180(1) described above, the "V-chip" circuitry 102 analyzes the program signal $S_P$ between 5:00 AM and 8:00 PM when the pre-school children are awake, preventing the pre-school children from watching any programs with a rating exceeding TV-G. The parent also specifies a television rating of TV-PG and a corresponding time range between 12:00 AM and 12:00 AM. Thus, the pre-teen children are prevented from watching any programs with a rating exceeding TV-PG at any time.

Figure 9:
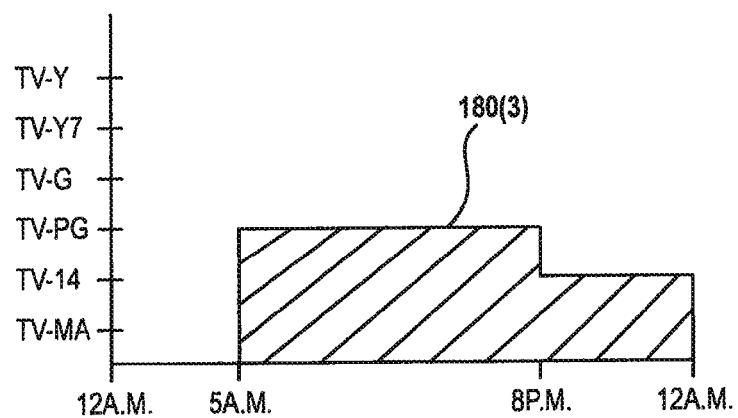
FIG. 9 is a multi-tiered rating/time contour, which can be generated by programming the "V-chip" system of FIG. 3.

FIG. 9 depicts a multi-tier rating/time contour 180(3) that can be programmed into the "V-chip" circuitry 102 by a parent with pre-school children and pre-teen children, and who wants to watch any program unencumbered by the "V-chip" circuitry 102 when the children are asleep. In this case, the parent specifies a television rating of TV-G and a corresponding time range between 5:00 AM and 8:00 PM. Thus, as with the rating/time counter 180(1) described above, the "V-chip" circuitry 102 analyzes the program signal $S_P$ between 5:00 AM and 8:00 PM when the pre-school children are awake, preventing the pre-school children from watching any programs with a rating exceeding TV-G. The parent also specifies a television rating of TV-PG and a corresponding time range between 8:00 PM and 10:00 PM. Thus, the "V-chip" circuitry 102 analyzes the program signal $S_P$ between 8:00 PM and 12:00 AM when the pre-teen children are awake, preventing the pre-teen children from watching any programs with a rating exceeding TV-PG. Between 10:00 PM and 5:00 AM, when the all of the children are asleep, the "V-chip" circuitry 102 does not analyze the program signal $S_P$, allowing adults to watch any program without intrusion from the "V-chip" circuitry 102.

Figure 10:
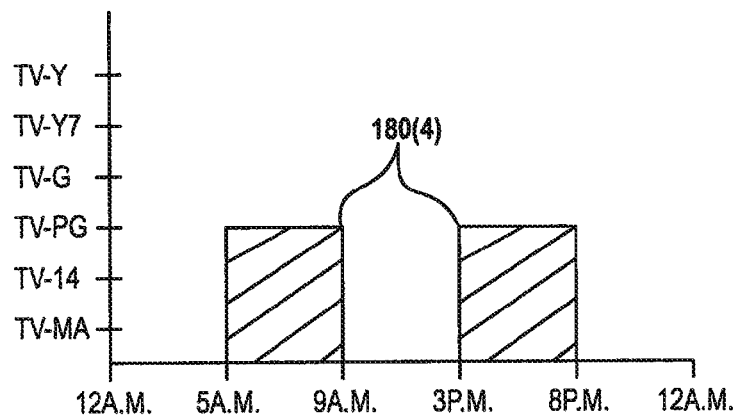
FIG. 10 is a daytime/nighttime rating/time contour, which can be generated by programming the "V-chip" system of FIG. 3.

FIG. 10 depicts a daytime/nighttime rating/time contour 180(4) that can be programmed into the "V-chip" circuitry 102 by a parent with pre-school children, and who particularly wants to watch television during a certain part of the day unencumbered by the "V-chip" circuitry 102. In this case, the parent specifies a television rating of TV-G and a first corresponding time range between 5:00 AM and 9:00 AM and a second corresponding time range between 3:00 PM and 8:00 PM. Thus, the "V-chip" circuitry 102 analyzes the program signal $S_P$ between 5:00 AM and 9:00 AM and 3:00 PM and 8:00 PM when the pre-school children are awake, preventing the pre-school children from watching any programs with a rating exceeding TV-G. Between 9:00 AM and 3:00 PM, when the pre-school children are either asleep or otherwise away from the television system 102 the "V-chip" circuitry 102 does not analyze the program signal $S_P$, allowing adults to watch any program without intrusion from the "V-chip" circuitry 102. Additionally, between 8:00 PM and 5:00 AM, when the pre-school children are asleep, the "V-chip" circuitry 102 does not analyze the program signal $S_P$, allowing adults to watch any program without intrusion from the "V-chip" circuitry 102.

Figure 11:
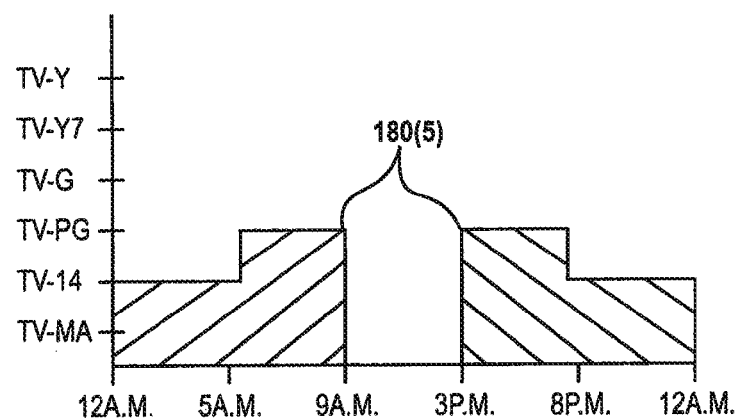
FIG. 11 is a daytime/nighttime rating/time contour with a maximum rating, which can be generated by programming the "V-chip" system of FIG. 3.

FIG. 11 depicts a daytime/nighttime rating/time contour 180(5) with a maximum rating that can be programmed into the "V-chip" circuitry 102 by a parent with pre-school and pre-teen children, and who particularly wants to watch television during a certain part of the day unencumbered by the "V-chip" circuitry 102. In this case, the parent specifies a television rating of TV-G and a first corresponding time range between 5:00 AM and 9:00 AM and a second corresponding time range between 3:00 PM and 8:00 PM. Thus, like the rating/time contour 180(4), the "V-chip" circuitry 102 analyzes the program signal $S_P$ between 5:00 AM and 9:00 AM and 3:00 PM and 8:00 PM when the pre-school children are awake, preventing the pre-school children from watching any programs with a rating exceeding TV-G. Between 9:00 AM and 3:00 PM, when the pre-school children are either asleep or otherwise away from the television system 100, the "V-chip" circuitry 102 does not analyze the program signal $S_P$, allowing adults to watch any program without intrusion from the "V-chip" circuitry 102. Additionally, between 8:00 PM and 5:00 AM, when the pre-school children are asleep, the "V-chip" circuitry 102 does not analyze the program signal SP, allowing adults to watch any program without intrusion from the "V-chip" circuitry 102.

Figure 12:
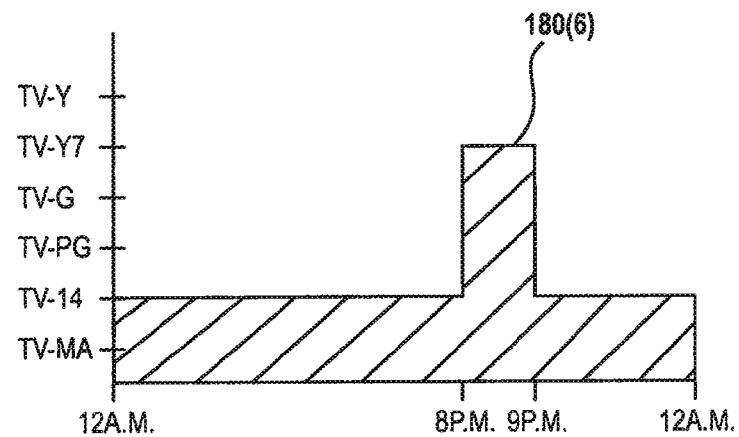
FIG. 12 is a program specific rating/time contour, which can be generated by programming the "V-chip" system of FIG. 3.

FIG. 12 depicts a program specific rating/time contour 180(6) with a maximum rating that can be programmed into the "V-chip" circuitry 102 by a parent that wants to prevent anyone from watching a specific program. In this case, the parent specifies a television rating of TV-MA and a corresponding time range between 12:00 AM and 12:00 AM. Thus, children are prevented from watching any programs with a rating exceeding TV-MA at any time. In addition, the parent specifies a television rating of TV-Y and a corresponding time range between 8:00 PM and 9:00 PM, which is a time range that corresponds with the time during which the prohibitive program is aired. Thus, no children can watch a program with a rating exceeding TV-Y during that time range.

Although the rating/time contours 180 have been described as being programmed into the "V-chip" circuitry 102 by the user, it can be appreciated that the rating/time contours 180 can be pre-programmed into the "V-chip" circuitry 102 by the manufacturer. In this case, the user can either select or alter a "preset" rating/time contour 180.

Furthermore, for purposes of simplification, the rating/time contours 180 have been described above with respect to only television ratings, and are thus two-dimensional. It can, thus, be appreciated that both movie ratings and subject matter categories can be programmed into the "V-chip" circuitry 102, thereby creating three-dimensional or even four-dimensional contours.

While preferred methods and embodiments have been shown and described, it will be apparent to one of ordinary skill in the art that numerous alterations may be made without departing from the spirit or scope of the invention. Therefore, the invention is not to be limited except in accordance with the following claims.

What is claimed:

1. A method of supervising personal exposure to a consumer electronics device having a V-chip, the method comprising:
    receiving a program signal suitable for conversion by the consumer electronics device into user discernible information;
    receiving a content-based indicator indicative of the content of the user discernible information and timing information indicative of a reference time;
    selecting a first content-based specification and a first finite time range specification associated with the first content-based specification, wherein the first finite time range specification is less than twenty-four hours in duration;
    selecting a second content-based specification different from the first content-based specification and a second finite time range specification associated with the second content-based specification, wherein the second finite time range specification is less than twenty-four hours in duration and encompassing a different time range than first finite time range specification;
    comparing the reference time with the first and second finite time range specifications;
    allowing user review of user discernible information without user input and without comparison of the received content-based indicator with a content-based specification if the reference time is outside the first and second finite time range specifications;
    comparing the received content-based indicator with the first content-based specification when the reference time falls within the first finite time range specification and with the second content-based specification when the reference time falls within the second finite time range specification; and
    impairing the program signal if the received content-based indicator exceeds the first content-based specification associated with the first finite time range specification when the reference time falls within the first finite time range specification or exceeds the second content-based specification associated with the second finite time range specification when the reference time falls within the second finite time range specification.

2. The method of claim 1, wherein the content-based indicator is carried by the program signal.

3. The method of claim 1, wherein the content-based indicator and the timing information are carried by the program signal.

4. The method of claim 1, wherein the timing information is generated within the consumer electronics device.

5. The method of claim 1, wherein the reference time indicated by the timing information is the current time.

6. The method of claim 1, wherein each of the received content-based indicator and the selected content-based specification is a rating.

7. The method of claim 6, further comprising generating a block control signal if the received rating exceeds the selected rating.

8. The method of claim 1, wherein each of the received content-based indicator and the selected content-based specification is a subject matter category.

9. The method of claim 8 further comprising generating a block control signal if the received content-based indicator subject matter category matches the selected subject matter category.

10. The method of claim 1, further comprising generating a control signal based on the comparison between the content-based specification and the received content-based indicator, wherein the control signal is a block control signal if the received content-based indicator exceeds the content-based specification, and wherein the program signal is impaired in response to the block control signal.

11. The method of claim 10, wherein the program signal is blocked in response to the block control signal.

12. The method of claim 1, wherein the consumer electronics device is a television system and the user discernible information comprises audio/video information.

13. The method of claim 1, further comprising:
    selecting a second content-based rating specification and a second finite time range specification, the second finite time range specification associated with the second content-based rating, wherein the second content-based rating is different from the first content-based rating.

14. The method of claim 13, wherein allowing user review of user discernible information without comparison of received content-based indicator with a content-based specification further comprises allowing user review of user discernible information without comparison of received content-based indicator with a content-based specification if the reference time is outside the first and second finite time range specifications.

15. The method of claim 14, further comprising comparing the second selected content-based rating with the received content-based rating when the reference time falls within the second finite time range specification.

16. The method of claim 15, further comprising impairing the program signal if the received content-based rating exceeds the second selected content-based rating.

17. The method of claim 1, further comprising:
selecting a second finite time range specification associated with the first content-based rating specification, wherein the second finite time range specification is different from the first finite time range specification.

18. The method of claim 17, wherein allowing user review of user discernible information without comparison of received content-based indicator with a content-based specification further comprises allowing user review of user discernible information without comparison of received content-based indicator with a content-based specification if the reference time is outside the first and second finite time range specifications.

19. The method of claim 18, further comprising comparing the selected content-based rating with the received content-based rating when the reference time falls within the second finite time range specification.

20. The method of claim 1, wherein the content-based specification and the finite time range specification are selected by a user of the consumer electronics device by inputting the content-based specification and finite time range specification into the consumer electronics device.

21. The method of claim 1, wherein the content-based specification and the finite time range specification are selected by a user of the consumer electronics device by selecting a content-based specification and finite time range specification pre-programmed by the manufacturer of the consumer electronics device.

22. A method of supervising the exposure to a consumer electronics device having a V-chip, the method comprising:
receiving a program signal suitable for conversion by the consumer electronics device into user discernible information;
receiving a content-based rating indicative of the content of the user discernible information;
receiving a timing signal indicative of a reference time;
selecting one or more finite time range specifications corresponding to a twenty-four hour period, wherein each of the one or more finite time range specifications is less than twenty-four hours in duration and encompass a different time range from other finite time range specifications,
selecting a content-based rating specification for each of the one or more finite time range specifications, wherein a content based rating specification is associated with each of the one or more finite time range specifications, wherein the content based rating specifications associated with the one or more finite time range specifications include one or more content-based rating specifications;
comparing the reference time with the one or more finite time range specifications;
allowing user review of user discernible information without user input and without comparison of the received content-based indicator with a content-based specification if the reference time is outside each of the one or more finite time range specifications;
comparing the received content-based rating when the reference time falls within one of the one or more finite time range specifications with the content-based specification associated with the one of the one or more finite time range specifications; and
impairing the program signal if the received content-based rating exceeds the content-based rating associated with the one of the one or more finite time range specifications.

23. The method of claim 22, wherein the program signal is impaired by scrambling the program signal.

24. The method of claim 22, wherein the program signal is impaired by blocking the program signal.

25. The method of claim 22, wherein the one or more selected time range specifications repeats for each day of a workweek.

26. A recordable medium for a consumer electronics device having a V-chip comprising:
a computer program comprising steps for:
receiving timing information indicative of a reference time and a content-based indicator indicative of the content of the user discernible information into which a program signal received by the consumer electronics device is converted;
selecting a content-based rating and a finite time range specification associated with the selected content-based specification, wherein the finite time range specification is less than twenty-four hours in duration;
comparing the finite time range specification with the reference time;
disabling the V-chip without user input if the reference time is outside the finite time range specification;
comparing the selected content-based specification with the received content-based indicator when the reference time falls within the finite time range specification; and
generating a control signal based on the comparison between the selected content-based specification associated with the finite time range specification and the received content-based indicator.

27. The recordable medium of claim 26, wherein each of the received content-based indicator and the selected content-based specification is a rating.

28. The recordable medium of claim 27, wherein the control signal is generated if the received rating exceeds the selected rating.

29. The recordable medium of claim 26, wherein each of the received content-based indicator and the selected content-based specification is a subject matter category.

30. The recordable medium of claim 29, wherein the control signal is generated if the received subject matter category matches the selected subject matter category.

31. The recordable medium of claim 26, wherein the control signal is generated to impair the program signal.

32. The recordable medium of claim 26, wherein the step of disabling the V-chip includes generating a control signal if the reference time is outside the finite time range specification, wherein the control signal is generated to allow the program signal to pass un-impaired.

33. A consumer electronics device having a V-chip for supervising personal exposure to user discernible information, comprising:
a non-volatile memory configured to store one or more finite time range specifications and one or more content-based specifications wherein each of the one or more finite time range specifications is less than twenty-four hours in duration and has a content-based specification of the one or more content-based specifications associated there with;
a logic unit coupled to the non-volatile memory and being configured to compare a received reference time with the one or more finite time range specifications and to disable the V-chip without user input if the reference time is outside the one or more finite time range specifications, and to compare a received content-based indicator with a content-based specification of the one or more content-based specifications associated with a finite time range specification when the reference time falls within a finite time range specification of the one or more finite time range specifications, the logic unit further configured to selectively generate one of a first and a second control signals in response to the comparison between the content-based indicator and the content-based specification associated with the finite time range specification; and a signal impairment mechanism coupled to the logic unit and configured for, based on the control signals, selectively passing a received program signal there through without substantial impairment or impairing the program signal.

34. The consumer electronics device of claim 33, further comprising an output device coupled to the signal impairment mechanism for transforming the program signal into the user discernible information.

35. The consumer electronics device of claim 33, further comprising a data entry system for selectively inputting the one or more content-based specifications and associated finite time range specifications into the non-volatile memory for storage.

36. The consumer electronics device of claim 33, wherein the non-volatile memory includes a look-up list for storing a plurality of content-based specifications and associated finite time range specifications.

37. The consumer electronics device of claim 33, wherein the program signal carries the content-based indicator and reference time, and further comprising a data extraction device coupled to the logic unit for extracting the content-based indicator and reference time from the program signal.

38. The consumer electronics device of claim 33, wherein the signal impairment device is a switch.

39. The consumer electronics device of claim 33, wherein the output device is a television system audio/video output device.

40. The consumer electronics device of claim 33, wherein the one or more content-based specifications and the one or more finite time range specification are pre-programmed by the manufacturer of the consumer electronics device, and further comprising a data entry system for selecting the pre-programmed content-based specification and finite time range specification.

41. The consumer electronics device of claim 33, wherein the first control signal is generated if the content-based indicator is within an allowable range of indicators defined by the content-based specification and wherein the second control signal is generated if the content-based indicator is outside the allowable range of indicators.

42. The consumer electronics device of claim 41, wherein the first control signal is usable to disable the V-chip.

43. The consumer electronics device of claim 33, wherein the non-volatile memory is further configured to store a first and a second finite time range specification and the logic unit is further configured to compare the received reference time with the second finite time range specification and to disable the V-chip if the reference time is outside the first and second finite time range specifications.

44. The consumer electronics device of claim 43, wherein the second finite time range specification is associated with a first content-based specification.

45. The consumer electronics device of claim 43, wherein the non-volatile memory is further configured to store a second content-based specification associated with the second finite time range specification and the logic unit is further configured to compare the second content-based specification with the content-based indicator and selectively generate one of the first and second control signals in response to the comparison between the content-based indicator and the second content-based specification, wherein the second content-based specification is different from the first content-based specification.

46. The recordable medium of claim 33, wherein disabling the V-chip includes the Logic Unit being further configured to generate a control signal if the reference time is outside the finite time range specifications, wherein the control signal is generated to allow the program signal to pass the signal impairment mechanism un-impaired.

* * * * *